No. 886,435. PATENTED MAY 5, 1908.
R. STRAUBEL.
BINOCULAR TELESCOPE.
APPLICATION FILED MAY 8, 1906.

Witnesses:

Inventor:
Rudolf Straubel

UNITED STATES PATENT OFFICE.

RUDOLF STRAUBEL, OF JENA, GERMANY, ASSIGNOR TO THE FIRM OF CARL ZEISS, OF JENA, GERMANY.

BINOCULAR TELESCOPE.

No. 886,435.   Specification of Letters Patent.   Patented May 5, 1908.

Application filed May 3, 1906. Serial No. 315,201.

*To all whom it may concern:*

Be it known that I, RUDOLF STRAUBEL, doctor of philosophy, a citizen of the German Empire, and residing at Carl Zeiss strasse, Jena, in the Grand Duchy of Saxe-Weimar, Germany, have invented a new and useful Binocular Telescope, of which the following is a specification.

The present invention consists in an improvement on the binocular telescope disclosed in the United States Patent No. 546,871. This telescope well-known also by public use is in the main a "horizontal" telescope, that is to say, a stereo-telescope, whose axis lies transversely to the direction of vision, and to which, when not in use, a more portable form can be given by folding the halves together. But the instrument presents a distance between the axes of the oculars, equal to the average interpupilary distance, say 65 mm, not merely when the single tubes are extended horizontally, so that the angle between the planes which are determined in each telescope by the entrance axis and the axis of the ocular is 180°, but also a second time, when the single tubes are nearly folded together, so that the said angle is 39°. An advantage gained by the main operative position is the enhanced appreciation of depth, and an advantage secured by the second operative position is the possibility of making observations from behind some obstacle which reaches above the head of the observer.

According to the present invention, these two properties can be made simultaneously, instead of alternatively, effective, if a slightly impaired degree of both advantages—observation over an obstacle and appreciation of depth—be allowed. This is accomplished by a particular arrangement of the joint, viz., such an one which with a distance between the oculars of 65 mm produces an inclination of the two tubes to one another of about a right angle, say from 70° to 120°. Hence the operative angular position of the so modified binocular telescope lies between the two operative angular positions of the original instrument. In order to make the binocular telescope capable of being completely folded together the position of the hinge relatively to the component telescopes should still fulfil the condition, that when the distance between the oculars is 65 mm the axis of the hinge lies at the same side of the plane containing the axes of the oculars as the entrance axes.

Figure 1:
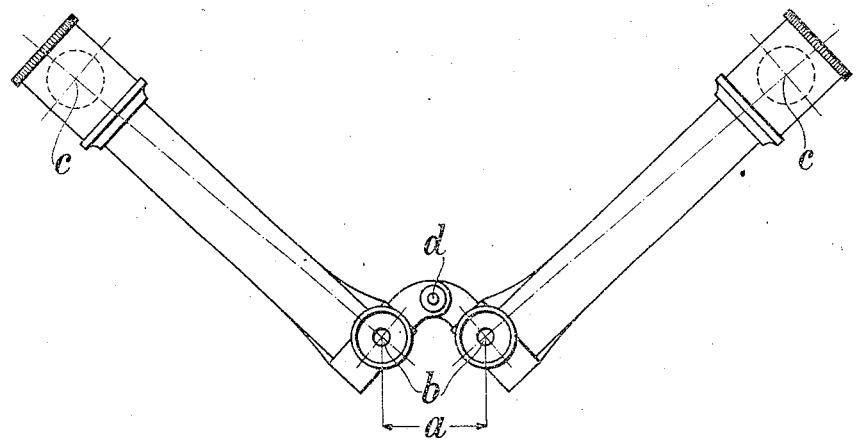
Figure 2:
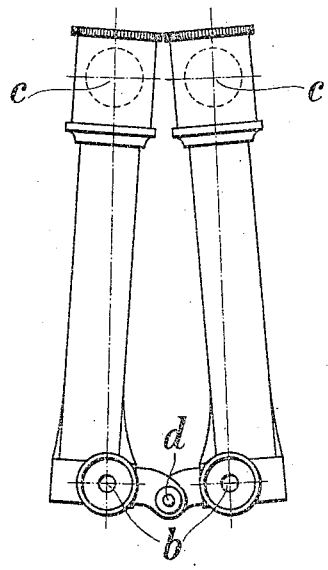

In the annexed drawing: Figure 1 is a front view of the improved binocular telescope in its operative position. Fig. 2 is another front view of the same instrument, the single tubes being folded together.

In this example the distance *a* between the axes *b* of the oculars is equal to the average inter-pupillary distance, when as shown in Fig. 1 the planes determined in each telescope by the entrance axis *c* and the ocular axis *b* include an angle of 100°. As the hinge axis *d* is situated at the same side of the plane containing the ocular axes *b b* as the entrance axes *c c*, the instrument can be completely folded together as shown in Fig. 2. As will be seen from Fig. 1, enhancing the angle between the tubes will only produce too small a distance between the oculars, and diminishing this angle as in Fig. 2 only too large a distance. There exists only the one operative position shown in Fig. 1.

What I claim as my invention, and desire to secure by Letters Patent, is—

1. In a collapsible binocular telescope the combination, with two component telescopes having their main tubes extending in a plane perpendicular to the direction of vision, of a hinge system enabling the component telescopes to be rotated in the said plane relatively to each other, such system being so located relatively to the component telescopes that a distance of 65 mm between the ocular axes occurs only, when the plane determined by the entrance axis and the ocular axis of one component forms an angle of from 70° to 120° with the corresponding plane of the other component, for the purpose set forth in the specification.

2. The combination with two telescopes the main tubes of which extend in a plane perpendicular to the direction of vision, of a hinge having its axis parallel to the direction of vision and connecting the telescopes so that, when the distance between the axes of the oculars is 65 mm, firstly, there is an angle of from 70° to 120° between the plane, determined by the entrance axis and the ocular axis of one component, and the corresponding plane of the other component, and, secondly, the hinge axis lies at the same side of the plane containing the ocular axes as the entrance axes.

In testimony whereof I have signed my name to this specification in the presence of two subscribing witnesses.

RUDOLF STRAUBEL.

Witnesses:
 PAUL KRÜGER,
 FRITZ SANDER.